(12) United States Patent
Langhammer et al.

(10) Patent No.: US 11,249,726 B2
(45) Date of Patent: Feb. 15, 2022

(54) INTEGRATED CIRCUITS WITH MODULAR MULTIPLICATION CIRCUITRY

(71) Applicant: Intel Corporation, Santa Clara, CA (US)

(72) Inventors: Martin Langhammer, Alderbury (GB); Bogdan Pasca, Toulouse (FR)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 16/566,059

(22) Filed: Sep. 10, 2019

(65) Prior Publication Data

US 2020/0004506 A1    Jan. 2, 2020

(51) Int. Cl.
*G06F 7/72*    (2006.01)
*G06F 7/499*   (2006.01)

(52) U.S. Cl.
CPC .......... *G06F 7/722* (2013.01); *G06F 7/49947* (2013.01); *G06F 7/721* (2013.01); *G06F 7/724* (2013.01)

(58) Field of Classification Search
CPC .. G06F 7/72–724; G06F 7/726; G06F 7/4887; G06F 7/49963
See application file for complete search history.

(56) References Cited

U.S. PATENT DOCUMENTS

| | | | |
|---|---|---|---|
| 5,274,707 A | 12/1993 | Schlafly | |
| 5,499,299 A * | 3/1996 | Takenaka | G06F 7/728 380/28 |
| 6,282,290 B1 | 8/2001 | Powell et al. | |
| 6,973,190 B1 | 12/2005 | Goubin | |
| 7,185,039 B2 | 2/2007 | Grinchuk | |
| 7,961,877 B2 | 6/2011 | Gopal et al. | |
| 8,767,955 B2 | 7/2014 | Teglia | |
| 2005/0147241 A1 | 7/2005 | Okeya et al. | |
| 2020/0265167 A1 * | 8/2020 | Banerjee | H04L 9/3093 |

OTHER PUBLICATIONS

J. Ding et al., A Modular Multiplier Implemented with Truncated Multiplication, IEEE Transactions on Circuits and Systems, II: Express Briefs, vol. 65, No. 11, 2018 (Year: 2018).*
S. Banescu et al., Multipliers for Floating-Point Double Precision and Beyond on FPGAs, Research Report No. 2010-15, ensl-00475781, version 1, 2010 (Year: 2010).*
M. Langhammer and B. Pasca, Efficient FPGA Modular Multiplication Implementation, FPGA '21, 2021 (Year: 2021).*
A. Menezes et al., Efficient Implementation, Handbook of Applied Cryptography, Oct. 1996, p. 591-634, Ch. 14, CRC Press, Boca Raton, Fl, U.S.

* cited by examiner

*Primary Examiner* — Jaweed A Abbaszadeh
*Assistant Examiner* — Emily E Larocque
(74) *Attorney, Agent, or Firm* — Fletcher Yoder, P.C.

(57) ABSTRACT

An integrated circuit is provided with a modular multiplication circuit. The modular multiplication circuit includes an input multiplier for computing the product of two input signals, truncated multipliers for computing another product based on a modulus value and the product, and a subtraction circuit for computing a difference between the two products. An error correction circuit uses the difference to look up an estimated quotient value and to subtract out an integer multiple of the modulus value from the difference in a single step, wherein the integer multiple is equal to the estimated quotient value. A final adjustment stage is used to remove any remaining residual estimation error.

20 Claims, 9 Drawing Sheets

| M | T' | | | Y |
|---|---|---|---|---|
| m in [205], | t in [ 0, 31] | | | |
| m in [205], | t in [ 32, 63] | | | |
| m in [205], | t in [ 64, 95] | | | INVALID |
| m in [205], | t in [ 96, 127] | | | |
| m in [205], | t in [ 128, 159] | | | |
| m in [205], | t in [ 160, 191] | | | |
| m in [205], | t in [ 192, 223] | | | |
| m in [205], | t in [ 224, 255] | 1 | 1 | Y=1 |
| m in [205], | t in [ 256, 287] | 1 | 1 | Y=1 |
| m in [205], | t in [ 288, 319] | 1 | 1 | Y=1 |
| m in [205], | t in [ 320, 351] | 1 | 1 | Y=1 |
| m in [205], | t in [ 352, 383] | 1 | 1 | Y=1 |
| m in [205], | t in [ 384, 415] | 1 | 2 | Y=1 |
| m in [205], | t in [ 416, 447] | 2 | 2 | Y=2 |
| m in [205], | t in [ 448, 479] | 2 | 2 | Y=2 |
| m in [205], | t in [ 480, 511] | 2 | 2 | Y=2 |
| m in [205], | t in [ 512, 543] | 2 | 2 | Y=2 |
| m in [205], | t in [ 544, 575] | 2 | 2 | Y=2 |
| m in [205], | t in [ 576, 607] | 2 | 2 | Y=2 |
| m in [205], | t in [ 608, 639] | 2 | 3 | Y=2 |
| m in [205], | t in [ 640, 671] | 3 | 3 | Y=3 |
| m in [205], | t in [ 672, 703] | 3 | 3 | Y=3 |
| m in [205], | t in [ 704, 735] | 3 | 3 | Y=3 |
| m in [205], | t in [ 736, 767] | 3 | 3 | Y=3 |
| m in [205], | t in [ 768, 799] | 3 | 3 | Y=3 |
| m in [205], | t in [ 800, 831] | 3 | 4 | Y=3 |
| m in [205], | t in [ 832, 863] | 4 | 4 | Y=4 |
| m in [205], | t in [ 864, 895] | 4 | 4 | Y=4 |
| m in [205], | t in [ 896, 927] | 4 | 4 | Y=4 |
| m in [205], | t in [ 928, 959] | 4 | 4 | Y=4 |
| m in [205], | t in [ 960, 991] | 4 | 4 | Y=4 |
| m in [205], | t in [ 992, 1023] | 4 | 4 | Y=4 |
| m in [205], | t in [ 1024, 1055] | 4 | 5 | Y=4 |
| m in [205], | t in [ 1056, 1087] | 5 | 5 | Y=5 |
| m in [205], | t in [ 1088, 1119] | 5 | 5 | Y=5 |
| m in [205], | t in [ 1120, 1151] | 5 | 5 | Y=5 |
| m in [205], | t in [ 1152, 1183] | 5 | 5 | Y=5 |
| m in [205], | t in [ 1184, 1215] | 5 | 5 | Y=5 |
| m in [205], | t in [ 1216, 1247] | 5 | 6 | Y=5 |
| m in [205], | t in [ 1248, 1279] | 6 | 6 | Y=6 |
| m in [205], | t in [ 1280, 1311] | 6 | 6 | Y=6 |
| m in [205], | t in [ 1312, 1343] | 6 | 6 | Y=6 |
| m in [205], | t in [ 1344, 1375] | 6 | 6 | Y=6 |
| m in [205], | t in [ 1376, 1407] | 6 | 6 | Y=6 |
| m in [205], | t in [ 1408, 1439] | 6 | 7 | Y=6 |
| m in [205], | t in [ 1440, 1471] | 7 | 7 | Y=7 |
| m in [205], | t in [ 1472, 1503] | 7 | 7 | Y=7 |
| m in [205], | t in [ 1504, 1535] | 7 | 7 | Y=7 |
| m in [205], | t in [ 1536, 1567] | 7 | 7 | Y=7 |
| m in [205], | t in [ 1568, 1599] | 7 | 7 | Y=7 |
| m in [205], | t in [ 1600, 1631] | 7 | 7 | Y=7 |
| m in [205], | t in [ 1632, 1663] | 7 | 8 | Y=7 |
| m in [205], | t in [ 1664, 1695] | 8 | 8 | Y=8 |
| m in [205], | t in [ 1696, 1727] | 8 | 8 | Y=8 |
| m in [205], | t in [ 1728, 1759] | 8 | 8 | Y=8 |
| m in [205], | t in [ 1760, 1791] | 8 | 8 | Y=8 |
| m in [205], | t in [ 1792, 1823] | 8 | 8 | Y=8 |
| m in [205], | t in [ 1824, 1855] | 8 | 9 | Y=9 |
| m in [205], | t in [ 1856, 1887] | 9 | 9 | Y=9 |
| m in [205], | t in [ 1888, 1919] | 9 | 9 | Y=9 |
| m in [205], | t in [ 1920, 1951] | 9 | 9 | Y=9 |
| m in [205], | t in [ 1952, 1983] | 9 | 9 | Y=9 |
| m in [205], | t in [ 1984, 2015] | 9 | 9 | Y=9 |
| m in [205], | t in [ 2016, 2047] | 9 | 9 | Y=9 | max=1

FIG. 7

|     | M | | T | | 802 | 804 | Y |
|---|---|---|---|---|---|---|---|
| | m in [128, | 159], | t in [ | 0, 31] | }INVALID | | |
| | ... | | | | | | |
| | m in [128, | 159], | t in [ | 96, 127] | | | |
| | m in [128, | 159], | t in [ | 128, 159] | 0 | 1 | |
| 810→ | m in [128, | 159], | t in [ | 160, 191] | 1 | 1 | — Y=1 |
| | m in [128, | 159], | t in [ | 192, 223] | 1 | 1 | |
| | m in [128, | 159], | t in [ | 224, 255] | 1 | 1 | |
| | m in [128, | 159], | t in [ | 256, 287] | 1 | 2 | |
| | m in [128, | 159], | t in [ | 288, 319] | 1 | 2 | |
| 812→ | m in [128, | 159], | t in [ | 320, 351] | 2 | 2 | — Y=2 |
| | m in [128, | 159], | t in [ | 352, 383] | 2 | 2 | |
| 814 { | m in [128, | 159], | t in [ | 384, 415] | 2 | 3 | |
| | m in [128, | 159], | t in [ | 416, 447] | 2 | 3 | |
| | m in [128, | 159], | t in [ | 448, 479] | 2 | 3 | |
| | m in [128, | 159], | t in [ | 480, 511] | 3 | 3 | — Y=3 |
| | m in [128, | 159], | t in [ | 512, 543] | 3 | 4 | |
| | m in [128, | 159], | t in [ | 544, 575] | 3 | 4 | |
| | m in [128, | 159], | t in [ | 576, 607] | 3 | 4 | |
| | m in [128, | 159], | t in [ | 608, 639] | 3 | 4 | |
| | m in [128, | 159], | t in [ | 640, 671] | 4 | 5 | — Y=4 |
| | m in [128, | 159], | t in [ | 672, 703] | 4 | 5 | |
| | m in [128, | 159], | t in [ | 704, 735] | 4 | 5 | |
| | m in [128, | 159], | t in [ | 736, 767] | 4 | 5 | |
| | m in [128, | 159], | t in [ | 768, 799] | 4 | 6 | |
| | m in [128, | 159], | t in [ | 800, 831] | 5 | 6 | — Y=5 |
| | m in [128, | 159], | t in [ | 832, 863] | 5 | 6 | |
| | m in [128, | 159], | t in [ | 864, 895] | 5 | 6 | |
| 816 { | m in [128, | 159], | t in [ | 896, 927] | 5 | 7 | |
| | m in [128, | 159], | t in [ | 928, 959] | 5 | 7 | |
| | m in [128, | 159], | t in [ | 960, 991] | 6 | 7 | |
| | m in [128, | 159], | t in [ | 992, 1023] | 6 | 7 | |
| | m in [128, | 159], | t in [ | 1024, 1055] | 6 | 8 | |
| | m in [128, | 159], | t in [ | 1056, 1087] | 6 | 8 | |
| | m in [128, | 159], | t in [ | 1088, 1119] | 6 | 8 | |
| | m in [128, | 159], | t in [ | 1120, 1151] | 7 | 8 | |
| | m in [128, | 159], | t in [ | 1152, 1183] | 7 | 9 | |
| | m in [128, | 159], | t in [ | 1184, 1215] | 7 | 9 | |
| | m in [128, | 159], | t in [ | 1216, 1247] | 7 | 9 | |
| | m in [128, | 159], | t in [ | 1248, 1279] | 7 | 9 | |
| | m in [128, | 159], | t in [ | 1280, 1311] | 8 | 10 | |
| | m in [128, | 159], | t in [ | 1312, 1343] | 8 | 10 | |
| | m in [128, | 159], | t in [ | 1344, 1375] | 8 | 10 | |
| | m in [128, | 159], | t in [ | 1376, 1407] | 8 | 10 | |
| | m in [128, | 159], | t in [ | 1408, 1439] | 8 | 11 | |
| | m in [128, | 159], | t in [ | 1440, 1471] | 9 | 11 | |
| | m in [128, | 159], | t in [ | 1472, 1503] | 9 | 11 | |
| | m in [128, | 159], | t in [ | 1504, 1535] | 9 | 11 | |
| | m in [128, | 159], | t in [ | 1536, 1567] | 9 | 12 | |
| | m in [128, | 159], | t in [ | 1568, 1599] | 9 | 12 | |
| | m in [128, | 159], | t in [ | 1600, 1631] | 10 | 12 | |
| | m in [128, | 159], | t in [ | 1632, 1663] | 10 | 12 | |
| | m in [128, | 159], | t in [ | 1664, 1695] | 10 | 13 | |
| 818 { | m in [128, | 159], | t in [ | 1696, 1727] | 10 | 13 | |
| | m in [128, | 159], | t in [ | 1728, 1759] | 10 | 13 | |
| | ... | | | | | | |
| | m in [224, | 255], | t in [ | 1568, 1599] | 6 | 7 | |
| | m in [224, | 255], | t in [ | 1600, 1631] | 6 | 7 | |
| | m in [224, | 255], | t in [ | 1632, 1663] | 6 | 7 | |
| | m in [224, | 255], | t in [ | 1664, 1695] | 6 | 7 | |
| | m in [224, | 255], | t in [ | 1696, 1727] | 6 | 7 | |
| | m in [224, | 255], | t in [ | 1728, 1759] | 6 | 7 | |
| | m in [224, | 255], | t in [ | 1760, 1791] | 6 | 7 | |
| | m in [224, | 255], | t in [ | 1792, 1823] | 7 | 8 | |
| | m in [224, | 255], | t in [ | 1824, 1855] | 7 | 8 | |
| | m in [224, | 255], | t in [ | 1856, 1887] | 7 | 8 | |
| | m in [224, | 255], | t in [ | 1888, 1919] | 7 | 8 | |
| | m in [224, | 255], | t in [ | 1920, 1951] | 7 | 8 | |
| | m in [224, | 255], | t in [ | 1952, 1983] | 7 | 8 | |
| | m in [224, | 255], | t in [ | 1984, 2015] | 7 | 8 | |
| | m in [224, | 255], | t in [ | 2016, 2047] | 7 | 9 | |
| | | | | | max=3 | | |

FIG. 8

INTEGRATED CIRCUITS WITH MODULAR MULTIPLICATION CIRCUITRY

BACKGROUND

This invention relates generally to integrated circuits and, in particular, to programmable integrated circuits configured to support modular exponentiation.

Integrated circuits used to implement smart network interface controllers (NICs) for connecting a computing device to a network often include circuitry for implementing data encryption schemes such as the Rivest-Shamir-Adleman (RSA) encryption algorithm. Such encryption circuitry need to perform many modular exponentiation operations, which are built upon many modular multiplications. Barrett's algorithm is a common method for performing a modular multiply operation. Barrett's algorithm, however, requires an accurate guess of the modulus, which in turn requires accurate trial multiplications or complex pre-calculations. The trial multiplications/pre-calculations are expensive in terms of both area and power, especially for input word sizes with hundreds or thousands of bits.

It is within this context that the embodiments described herein arise.

BRIEF DESCRIPTION OF THE DRAWINGS

FIG. 7 is a diagram of an illustrative estimated quotient lookup table for a single value of modulus M in accordance with an embodiment.

FIG. 8 is a diagram of an illustrative estimated quotient lookup table for multiple values of modulus M in accordance with an embodiment.

DETAILED DESCRIPTION

The present embodiments relate to an integrated circuit configured to implement modular multiplications. A modular multiply circuit may include an input multiplication circuit for computing the product of two inputs and a reduction circuit that receives the product and a modulus input. The reduction circuit may be configured to compute an initial estimate using partial multipliers with large LSB (least significant bit) errors. A subsequent conversion estimate can then be made by observing only a small MSB (most significant bit) range of subsequent trial subtractions to converge to the correct value. Small trial subtractions are orders of magnitudes smaller than trial multiplications, which can save area and reduce power consumption.

It will be recognized by one skilled in the art, that the present exemplary embodiments may be practiced without some or all of these specific details. In other instances, well-known operations have not been described in detail in order not to unnecessarily obscure the present embodiments.

Figure 1:
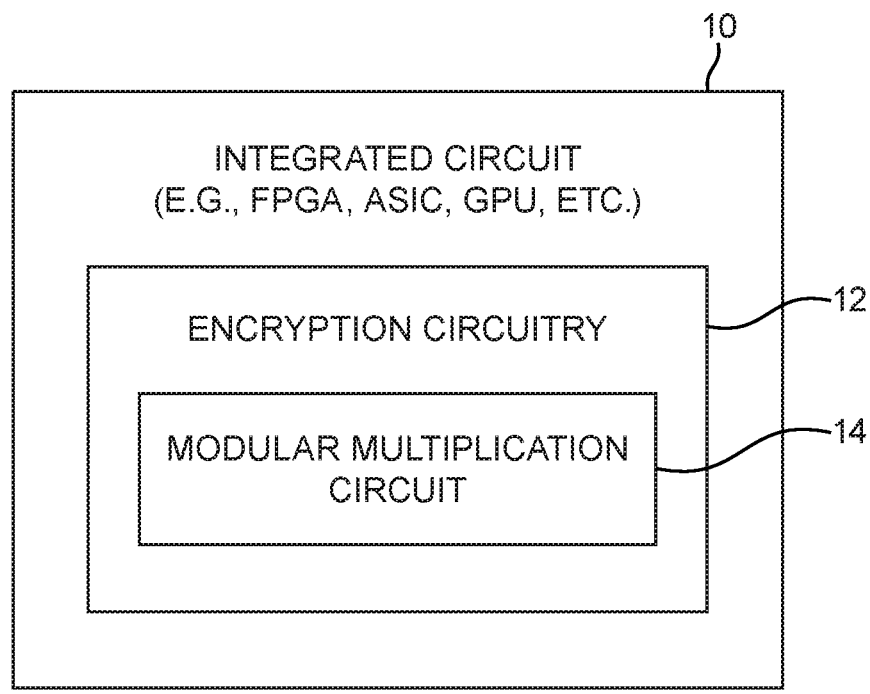
FIG. 1 is a diagram of an illustrative integrated circuit that includes encryption circuitry in accordance with an embodiment.

FIG. 1 is a diagram of an illustrative integrated circuit die 10 that includes encryption circuitry. Integrated circuit device 10 may, for example, be a central processing unit (CPU), a programmable integrated circuit, a graphics processing unit (GPU), an application-specific integrated circuit (ASIC), an application specific standard product (ASSP), a microcontroller, a microprocessor, etc. Examples of programmable integrated circuits include programmable logic devices (PLDs), field programmable gate arrays (FPGAs), programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), and complex programmable logic devices (CPLDs), just to name a few.

As shown in FIG. 1, integrated circuit may include encryption circuitry such as encryption circuity 12. Encryption circuitry 12 may be used to encrypt and/or decrypt data at device 10. Encryption circuitry 12 may be used to implement encryption schemes such as the Rivest-Shamir-Adleman (RSA) encryption algorithm, the Advanced Encryption Standard (AES) algorithm, the Blowfish encryption algorithm, the Twofish encryption algorithm, the Triple Data Encryption Standard (DES) algorithm, the International Data Encryption algorithm (IDEA), the Secure Hash Algorithm (SHA), and/or other data encryption methods.

The various encryption processes above rely on modular exponentiation operations, which may be built upon modular multiplies. Thus, encryption circuitry 12 may include one or more modular multiplication circuit 14 configured to implement modular multiplication. Although only one representative modular multiplication circuit 14 is shown in the example of FIG. 1, encryption circuitry 14 may generally include any suitable number of modular multiplication circuits.

Figure 2:
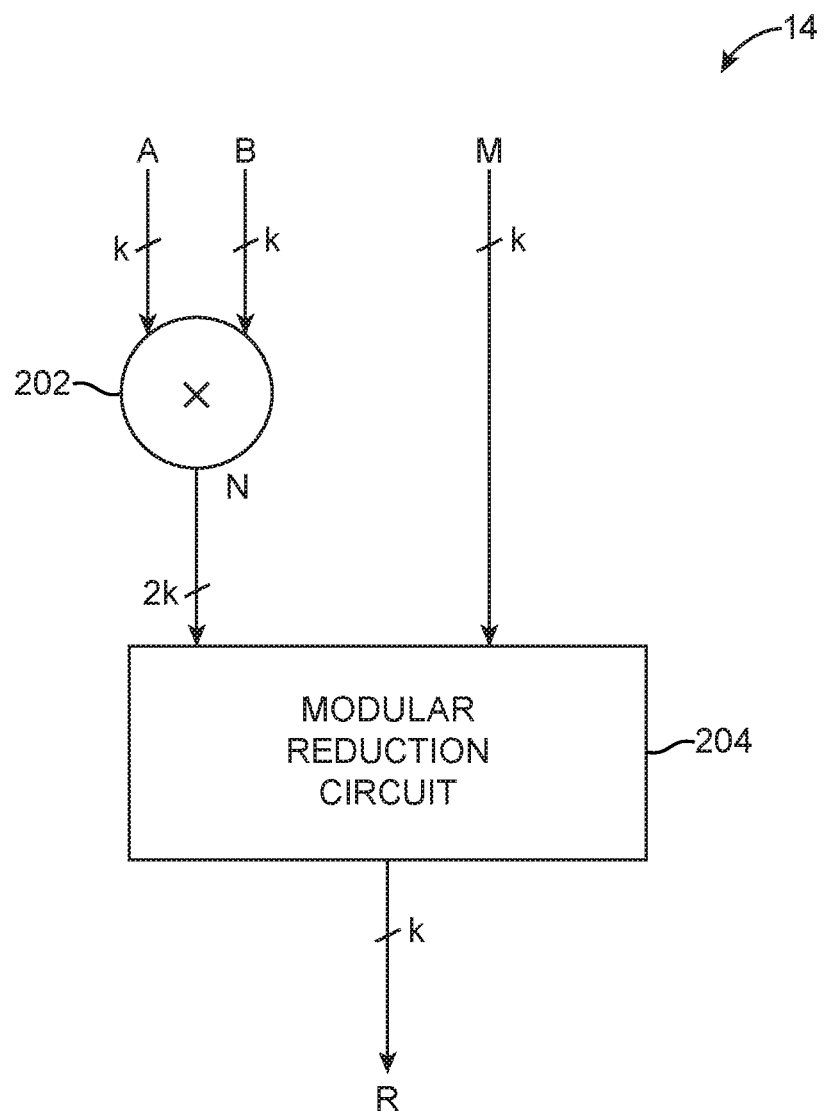
FIG. 2 is a diagram of an illustrative modular multiplication circuit in accordance with an embodiment.

FIG. 2 is a diagram of an illustrative modular multiplication circuit 14 in accordance with an embodiment. As shown in FIG. 2, modular multiplication circuit 14 may have a first input port configured to receive a first input signal A, a second input port configured to receive a second input signal B, and a third input port configured to receive a modulus value M. Input signals A, B, and M may each have k bits, where k might be in the range of 1-10, 10-100, 100-1000, 1000+, 2000+, 5000+, or any suitable integer.

Modular multiplication circuit 14 may further include a wide input multiplication circuit 202 configured to multiply A and B to compute corresponding product N. Product N may be 2 k bits wide. The input multiplication circuit 202 may be followed by a modular reduction circuit 204. One or more additional multiplications may (effectively) be performed at modular reduction circuit 204 to obtain a final result R, where:

$$R = N \bmod M \tag{1}$$

where N is equal to A*B, and where R is also a k-bit result that is less than M. The final result R is also sometimes referred to as the "remainder" of the modulo operation.

Figure 3:
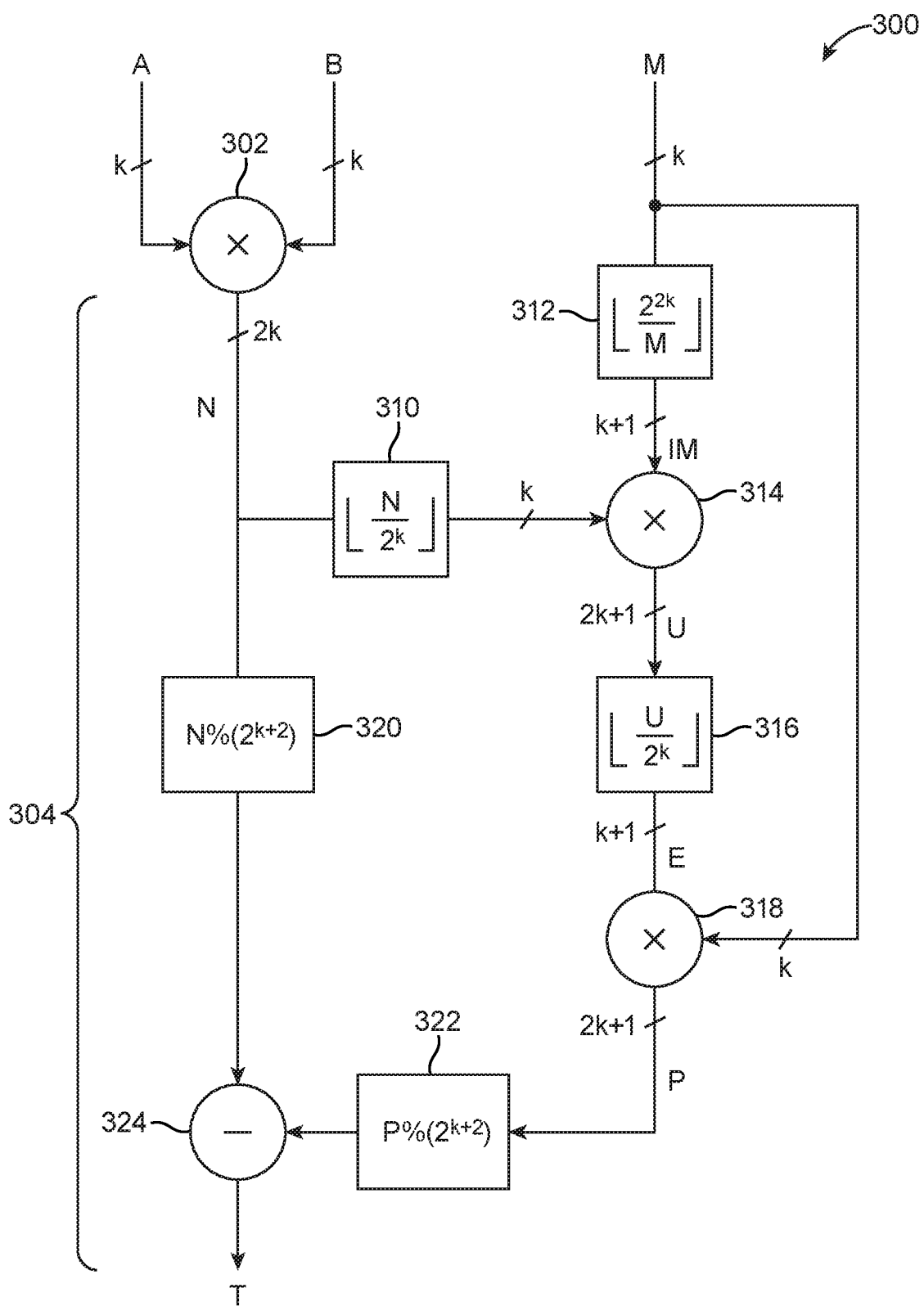
FIG. 3 is a diagram showing one suitable implementation of a reduction circuit within a modular multiplication circuit.

One way of implementing the modular reduction at circuit 204 is using Barrett's reduction method. Barrett's reduction scheme obtains the final R result by subtracting an integer multiple of M from N. The integer multiple is obtained via multiplying N by the inverse of the modulus value and then rounding down that result to the nearest integer. FIG. 3 is a diagram showing one suitable implementation of a modular multiplication circuit 300 configured to implement Barrett's reduction.

As shown in FIG. 3, circuit 300 includes a wide input multiplier 302 configured to receive k-bit input signals A and B and to output a corresponding 2k-bit product N, where N is equal to A*B. The remaining circuit components belong as part of the modular reduction circuit, as shown by portion 304.

A first circuit 312 is configured to compute an inverted version of M (or "IM") by dividing $2^{(2k)}$ by M and then rounding down by taking the floor of the result. The inverted modulus IM has (k+1) bits. A second circuit 310 is configured to effectively drop the k bottom bits of N by dividing N by $2^k$ and then using the floor operation to drop all the fractional bits. This operation can be implemented by a right shift of k bit positions while ignoring all bits that are shifted out.

A first reduction multiplier circuit 314 is configured to multiply the output from circuit 310 with the inverted modulus IM generated by circuit 312 to obtain a value U, which has (2k+1) bits. A third circuit 316 is configured to effectively drop the k bottom bits of U by dividing U by $2^k$ and then using the floor operation to drop all the fractional bits. This operation can be implemented by a right shift of k bit positions while ignoring all bits that are shifted out. The output of circuit 316 is equal to value E, which also has (k+1) integer bits. The value E is within 1 unit of the number of times M fits in N and may be an underestimation. A second reduction multiplier circuit 318 is configured to multiply E by the modulus value M to generate a corresponding value P, which has (2k+1) bits.

A fourth circuit 320 is configured to drop the top k bits of N (e.g., by computing N mod $2^{(k+2)}$) while a fifth circuit 322 is configured to drop the top k+1 bits of P (e.g., by computing P mod $2^{(k+2)}$). A subtraction circuit 324 is configured to compute the difference of the values received from circuits 320 and 322 to generate T (i.e., T is equal to N minus P). Value P represents an integer multiple of M, where T should be close to the actual modulus M. If T is less than M, then the final result R is equal to T. If T is greater than or equal to M, then R will be equal to T minus M (i.e., one more subtraction is required at the end).

The following numeric example helps illustrate the operation of circuit 300. Consider, for example, a scenario in which k=8, A=174 (i.e., "10101110" in binary format), B=201 (i.e., "11001001" in binary), and M=205 (i.e., "11001101"). Input multiplier 302 will then output a product N by computing A*B, which will be equal to 34974 (or "1000100010011110" in binary).

The reciprocal of M (i.e., 1/M) is equal to "0.000000010011111101100000001001 . . ." and the (k+1) or 9 bits of the reciprocal that are stored as IM start at the $8^{th}$ fractional bit (see emphasized bit string above). In other words, $2^{(2k)}$ divided by M will be the reciprocal value above shifted left by k bit positions to yield "100111111.101100000001001 . . . ." The fractional bits to the right of the binary radix point will be dropped by the floor function, and the resulting IM value will be equal to "100111111" in binary or 319 in decimal format.

Circuit 310 computes floor(N/$2^k$), which is equal to "10001000" in this example. Reduction multiplier 314 computes U by multiplying the result of circuit 310 by IM. Thus, U will be equal to "10001000" multiplied by "100111111", which is equal to "1010100101111000" in binary or 43384 in decimal. Circuit 316 generates E by computing floor(U/$2^k$), which is equal to "010101001" in binary or 169 in decimal in this example.

Reduction multiplier 318 computes P by multiplying E and M, which yields 34645 in this case. Finally, subtraction circuit 324 computes T by subtracting P from N, which is equal to (34974 minus 34645) or 329. This subtraction operation need not span the entire 2*k length of N since we know that T is greater than or equal to zero and less than 2*M. In other words, the subtraction may only be performed on the bottom (k+1) bits of N and P while ignoring the remaining top bits. Since T of 329 is greater than M=205, one more subtraction is needed here so that final remainder value R is equal to (329-205) or 124.

In the arrangement of FIG. 3, the computation of N=A*B at input multiplier 302 requires a full output vector. The computation of U at first reduction multiplier 314 yields (2k+1) bits, but only the top (k+1) bits are used for value E. Similarly, the computation of P at second multiplier 318 yields (2k+1) bits, but only the bottom (k+1) bits are used to compute T at subtraction circuit 324. In both of these instances, a "partial" or "truncated" multiplier may replace multiplier 314 and/or multiplier 318 to dramatically reduce hardware cost while minimizing power usage. A partial or truncated multiplier is a multiplier that computes only a part of the full resulting product.

Figure 4:
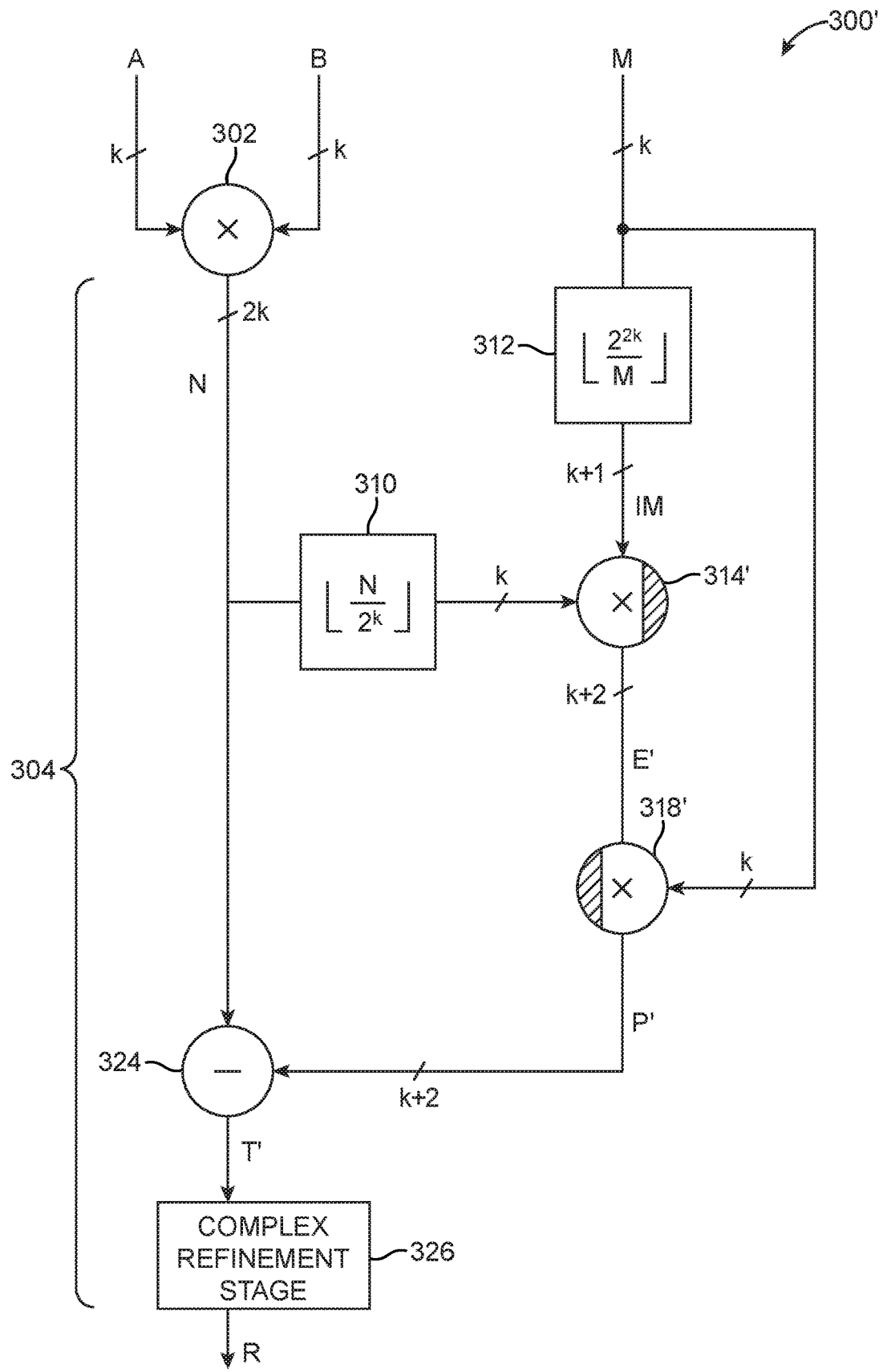
FIG. 4 is a diagram showing a modular multiplication circuit implemented using partial/truncated multipliers.

FIG. 4 is a diagram showing a modular multiplication circuit 300' implemented using partial/truncated multipliers. As shown in FIG. 4, the first reduction multiplier 314' is implemented as a truncated multiplier that only partially computes the top (k+2) bits and therefore directly outputs a value E' (while the remaining LSB bits are not even computed). The value E' represents an approximate number of times M fits in N. The second reduction multiplier 318' is implemented as a truncated multiplier that only partially computes the bottom (k+2) bits and outputs a value P' (while the remaining MSB bits are not even computed).

Aggressively truncating the reduction multipliers in this way can help reduce the hardware complexity of modular multiplication circuit 300' but will risk creating a multi-bit error in the LSBs of the truncated multipliers. In other words, it is possible that E' generated in the truncated arrangement of FIG. 4 will be less accurate than E generated in non-truncated the arrangement of FIG. 3 (i.e., E' may be several integers off), which results in a difference T' that might be more than one times away from M (i.e., T' may be greater than 2M). As a result, more than one iterative subtraction may be needed at final refinement stage 326 (see bottom of FIG. 3) to generate the final remainder output R. Iterating through multiple subtractions may be costly and would increase the complexity of the final refinement stage 326. Moreover, large k-bit subtractions can be very expensive in terms of area and latency. In some scenarios the overall increase in the adder of the adder carry chain that is required at complex refinement stage 326 may be even greater than the area decrease in the partial multipliers.

Another technique for reducing the cost of the reduction multipliers is to ensure that the modulus value M is carefully chosen so that both M and its inverse are "sparse." Typically, the modulus value M for popular encryption algorithms has a leading one, is odd, and is oftentimes considered sparse.

For example, consider a scenario in which M is a 256-bit value that is equal to "ffffffeffffffffffffffffffffffff00000000ffffffff ffff" in hexadecimal format. Although this doesn't initially appear sparse, the long runs of ones can be replaced with an addition and a subtraction. For instance, seven ("0111") is equal to eight minus one ("1000" minus "0001"). Thus a polynomial that can be used to implement the 256-bit value M above is [2^(256)*x+2^(224)*x+2^(96)*x+2^(64)*x−x]. The inverse of this polynomial is "0x1.0000000100000001000000010000000010000 0002000000020000000 200000003", which is also very sparse.

Figure 5A:
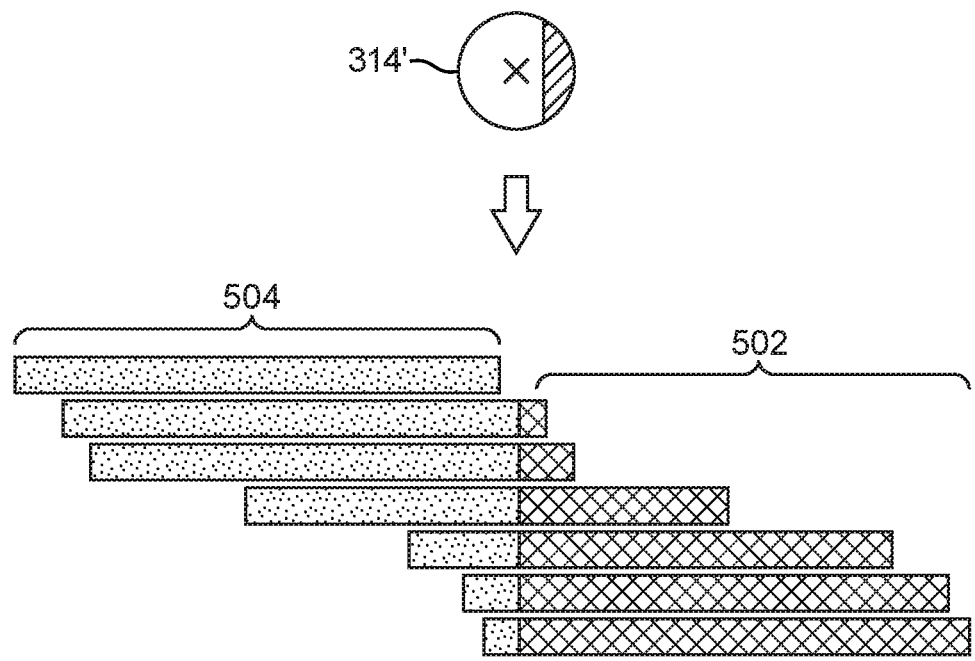
FIGS. 5A and 5B are diagrams showing how sparse multiplications can be implemented by summing partial products in accordance with an embodiment.
Figure 5B:
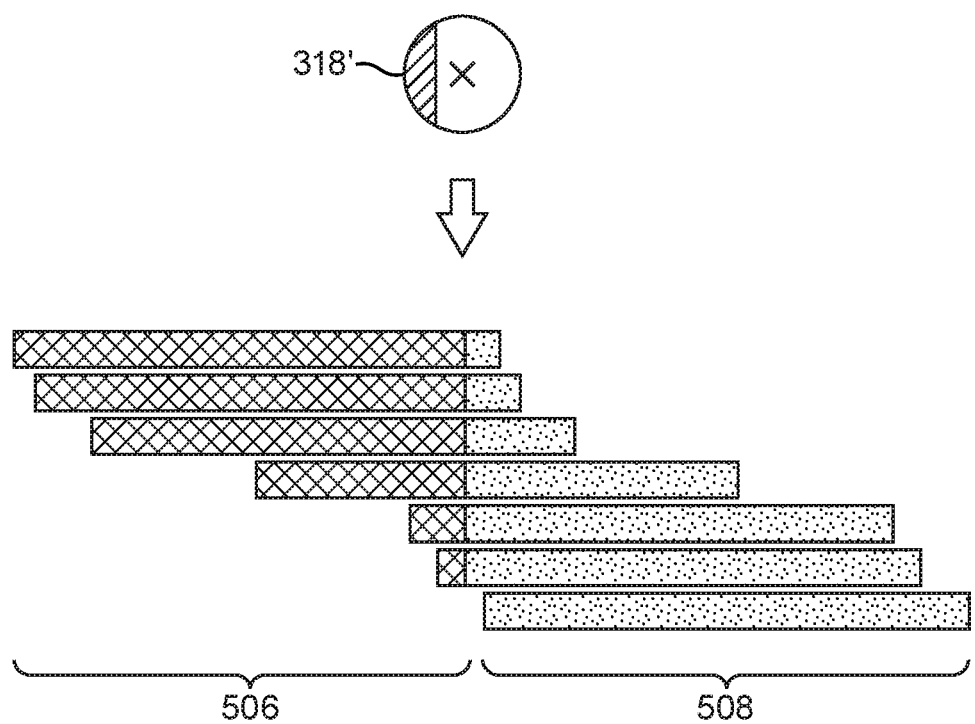

FIGS. 5A and 5B are diagrams showing how sparse multiplications can be implemented by summing partial products. FIG. 5A illustrates how truncated reduction multiplier 314' that receives a sparse IM need only to compute and sum together the top MSB portion 504 of different shifted instances of IM (while completely ignoring the bottom LSB portion 502). Similarly, FIG. 5B illustrates how truncated reduction multiplier 318' that receives a sparse M need only to compute and sum together the bottom LSB portion 508 of different shifted instances of M (while completely ignoring the top MSB portion 506). The addition of the various shifted values may be implemented using a carry propagate adder, a carry save adder, a combination of different adder architectures, or other suitable adder structures.

Figure 6:
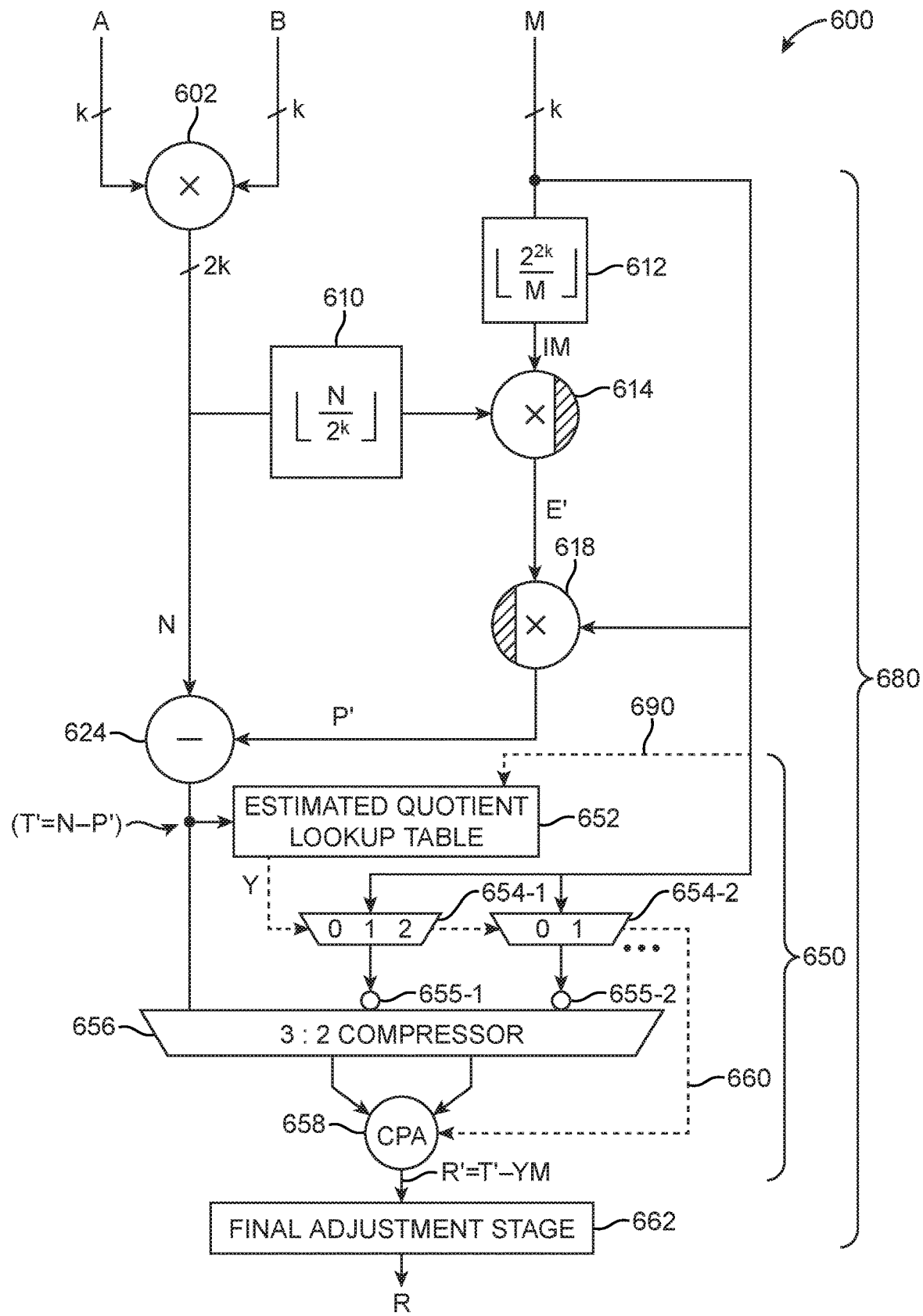
FIG. 6 is a diagram of an illustrative modular multiplication circuit that includes a single-step error correction circuit in accordance with an embodiment.

In accordance with an embodiment, a modular multiplication circuit 600 is provided that includes a single-step error correction circuit that removes the possible errors resulting from multiplier truncation in a single step (see, e.g., FIG. 6). As shown in FIG. 6, circuit 600 may include a wide input multiplier 602 configured to receive k-bit input signals A and B and to outputting a corresponding 2k-bit product N, where N is equal to A*B. The remaining circuit components may belong as part of the modular reduction circuit, as shown by portion 680.

A first circuit 612 may be configured to compute inverted value IM by dividing $2^{(2k)}$ by M and then taking the floor value. The inverted modulus IM may have (k+1) bits. A second circuit 610 may be configured to effectively drop the k bottom bits of N by dividing N by $2^k$ and then flooring the result to drop all the fractional bits. This operation can be implemented by a right shift of k bits while ignoring all bits that are shifted out.

First reduction multiplier 614 may be a truncated/partial multiplier circuit that only partially computes the top (k+2) bits and outputs value E'. The value E' represents an approximate number of times M might fit into N. Second reduction multiplier 618 may be a truncated/partial multiplier circuit that only partially computes the bottom (k+2) bits and outputs a value P'. Subtraction circuit 624 may be configured to generate difference T' by subtracting P' from product N.

As described above in connection with the example of FIG. 4, the use of truncated multipliers is that estimated multiple E' may be off by several integers. Assuming the error at T' is several integer multiples of modulus value M, the total difference T' may be equal to (Y*M+R), where R is less than M. Thus, if Y is equal to one, then T' will be between M and (2*M−1). In another example, if Y is equal to two, then T' will be from 2*M to (3*M−1). In yet another example, if Y is equal to three, then T' will be in the range from 3*M to (4*M−1), and so on. Therefore, there is no overlap between errors.

The circuitry 650 downstream of subtraction circuit 624 computes (T' minus Y*M) in a single step to obtain a trial result R'. Circuitry 650 is therefore sometimes referred to as a single-step error correction circuit. A final adjustment stage 662 may perform at most one final subtraction operation to output final remainder value R.

To determine the error range, the upper MSBs of T' may be used to look up an estimated quotient lookup table 652 to determine an estimated quotient Y (sometimes also referred to as an "error multiple"). For example, only the top eight bits of T' might be used to look up table 652 with a relatively small chance of misprediction. Any potential residual error can be resolved with a single addition (e.g., for implementing subtraction in two's complement form) at the final adjustment stage 662. This example in which the upper 8 MSBs of T' are used to look up table 652 is merely illustrative. If desired, the upper 4 bits of T' may be used, the upper 5 bits of T' may be used, the upper 6 bits of T' may be used, or other suitable subset of T' may be used to look up table 652.

The estimated multiple Y may be smaller than the actual multiple of M but never more. Correction circuit 650 may therefore perform a trial subtraction of (T'−Y*M), which can be performed in redundant form addition rather than requiring an actual multiplier. Assuming Y can be 0-6, the trial subtraction can be achieved by a first shift of M by 0, 1, or 2 bits and by a second shift of M by 0 or 1 bit (since a maximum value of 6 requires at most two high bits). One or both shifts may optionally be zeroed out, such as when Y=0.

In the example of FIG. 6, the first shift is implemented using selection circuit 654-1. If the "0" input of circuit 654-1 is selected, a non-shifted version of M is passed through. If the "1" input of circuit 654-1 is selected, M shifted by one bit to the left may be routed through. If the "2" input of circuit 654-1 is selected, M shifted by two bits to the left may be routed through. Similarly, the second shift is implemented using selection circuit 654-2. Negation component 655-1 implements a one's complement conversion for the first selection circuit 654-1, whereas negation component 655-2 implements a one's complement conversion for the second selection circuit 654-2.

Together with a 3:2 adder compressor circuit 656 and a carry propagate adder (CPA) 658, which may receive multiple carry ins of "1" via path 660 for implementing the full two's complement subtraction, adder 658 may generate penultimate or trial remainder result R', which is equal to (T'−Y*M). The number of carry ins needed may depend on the number of active circuits 654. The product Y*M is sometimes referred to as an estimated integer multiple of modulus value M. Computing R' in this way to remove estimated integer multiple amount Y*M in a single step using table lookup of Y and redundant form addition to mimic a multiply can allow modular multiplication circuit 600 to be used with truncated multipliers without having to worry about the possibility of having to perform several iterations of large subtraction at the end of the reduction process, which reduces the size while improving the maximum performance of the overall encryption circuitry.

There is a small chance that the single-step trial subtraction result R' still contains M, in which case the final adjustment stage 662 will perform a single subtraction. Alternatively, the entire pipeline can be stalled for one cycle to allow CPA 658 to perform one more subtraction, which obviates the need to form final adjustment stage 662. The stalling control logic is not shown in FIG. 6 in order not to obscure the present embodiments. Assuming Y is limited to a small value (e.g., if Y is less than 10), the probability of misprediction where the final adjustment is need is very small. In such scenarios, stalling the pipeline may only be required once in several thousand operations, which will provide a good tradeoff in performance impact versus area savings. If desired, additional shifting/selection circuits 654 and a wider compressor 656 might be used if Y is expected to have a larger value greater than six, greater than eight, greater than 10, greater than 20, etc.

FIG. 7 is a diagram of an illustrative estimated quotient lookup table 700 for a single value of modulus M. In the example of FIG. 7, modulus value M stays fixed at 205 and table 700 lists the estimated quotient value Y as a function of T' in various ranges assuming an 8-bit input. The various ranges are due to the fact that the table inputs only the top 6 MSBs of T'. Column 702 represents possible Y values when the remaining LSBs of T' are all zeros. The values in column 702 may therefore be generated by computing the floor of the smallest value of T' in that range (e.g., the first T' value in each row) divided by M. Column 704 represents possible Y values when the remaining LSBs of T' are all ones. The values in column 704 may therefore be generated by computing the floor of the largest value of T' in that range (e.g., the second T' value in each row) divided by M. The final estimated quotient (or estimated multiple) Y may be conservatively set equal to the minimum of the two corresponding values in columns 702 and 704.

As shown in FIG. 7, Y is invalid for T' values in the range of [0, 223]. Row 708 in table 700 is the first row that outputs a value Y of 1. Row 710 is the first row where the corresponding value in column 704 changes to 2 (since the floor of 415/205 rounds down to 2). However, Y still remains at 1 since the smaller of the two column values is used. Row 711 is the first row where both values in columns 702 and 704 are equal to 2. As a result, Y will now be equal to 2.

In this 8-bit example, Y may go theoretically up to a value of 9. In practice, however, if it is known that Y is limited to a maximum value of 6, portion 716 may be stored in the lookup table but unused. As described above in connection with FIG. 6, a max Y value of 6 may allow implementation of a multiply via redundant form addition using only two shifting circuits.

In FIG. 7, the maximum estimation error (i.e., the maximum difference between the values in columns 702 and 704 in each row) is equal to 1. These instances are illustrated in at least rows 710, 712, and 714, where the values in columns 702 and 704 differ by at most one. In these particular situations, the final adjustment stage 662 (see FIG. 6) may need to apply one extra subtraction of M to obtain the final remainder output R.

If the modulus value M changes rarely or very infrequently, then the estimated quotient lookup table may be reloaded from an external source whenever new values are needed. During modular exponentiation operations where each exponentiation may perform thousands of modular multiplies, the value of M only changes between successive modular exponentiations. Compared to the complexity of modular exponentiation, re-computing the estimated quotient lookup table for a new M is relatively straightforward.

In another suitable arrangement, the modulus value M might change more frequently. For example, if M changes every cycle, then the estimated quotient table may be made more generic by including ranges for M. The dynamically changing value of M may be fed to lookup table 652 via path 690 (see, e.g., FIG. 6). FIG. 8 is a diagram of an illustrative estimated quotient lookup table 800 for multiple values of modulus. In the example of FIG. 8, table 800 lists the estimated quotient value Y as a function of both M and T' in various ranges assuming an 8-bit input. The various ranges of M are due to the fact that the table inputs only the top 3 bits of M, whereas the various ranges to T' are due to the fact that the table inputs only the top 6 MSBs of T'.

Column 802 represents the minimum (best case) possible Y values that are computed by taking the lower range of T', dividing that by the upper range of M, and then flooring the result to round down to the nearest integer. Column 804 represents the maximum (worst case) possible Y values that are computed by taking the upper range of T', dividing that by the lower range of M, and then flooring the result to round down to the nearest integer. The final estimated multiple Y may be conservatively set equal to the minimum of the two corresponding values in columns 802 and 804.

As shown in FIG. 8, Y may be invalid for low values of M and T'. Row 810 in table 800 is the first row that outputs a value Y of 1. Row 812 is the first row that outputs a value Y of 2, and so on. In this 8-bit example, Y may go theoretically up to a value of 9. In FIG. 8, the maximum estimation error (i.e., the maximum difference between the values in columns 802 and 804 in each row) is equal to 3. For example, rows 814 illustrate instances where the estimation error is equal to 1 (e.g., 3 minus 2); rows 816 illustrate instances where the estimation error is equal to 2 (e.g., 7 minus 5); and rows 818 illustrate instances where the estimation error is equal to 3 (e.g., 13 minus 10). In these particular situations, the final adjustment stage 662 (see FIG. 6) may need to apply up to three extra subtractions of M to obtain the final remainder output R.

Figure 9:
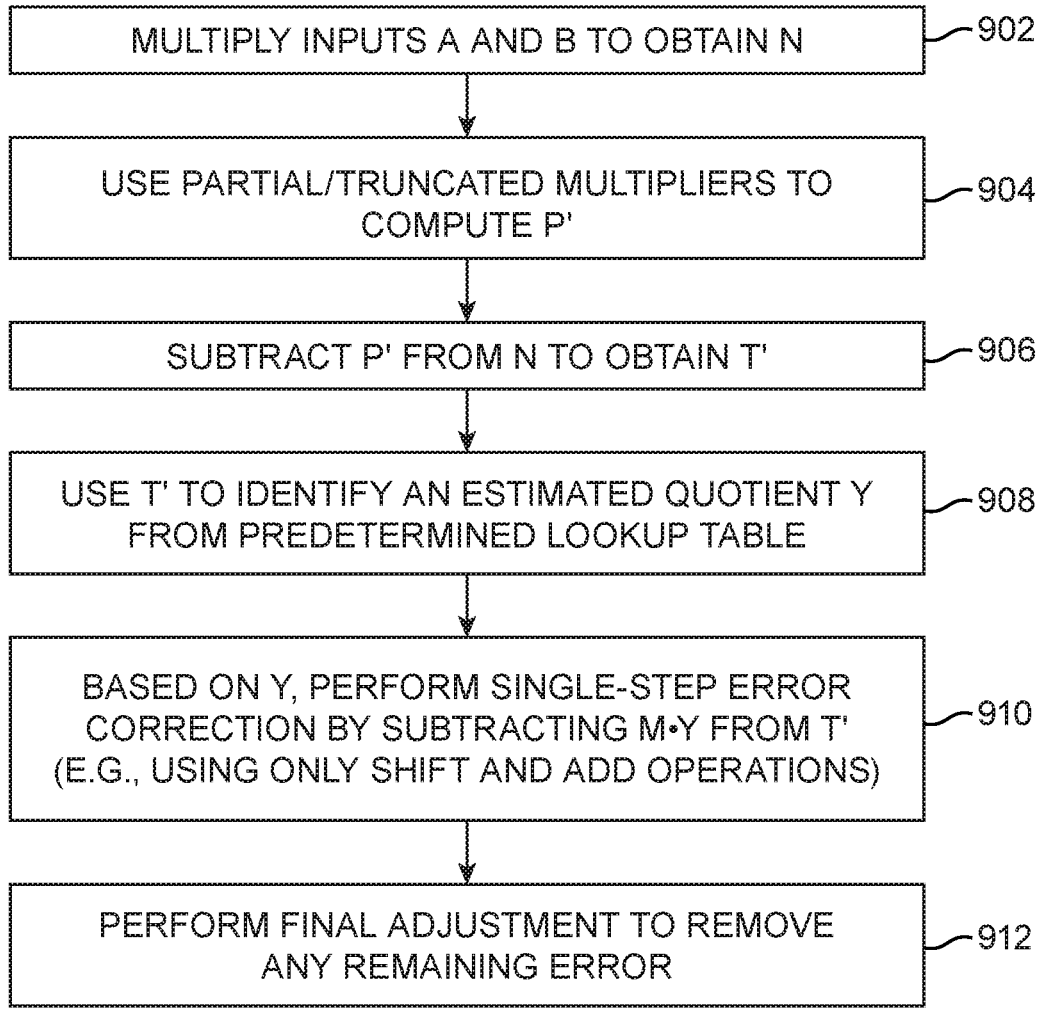
FIG. 9 is a flow chart of illustrative steps for operating the circuitry described in connection with FIGS. 6-8 in accordance with an embodiment.

FIG. 9 is a flow chart of illustrative steps for operating the circuitry described in connection with FIGS. 6-8. At step 902, the input multiplier 602 may be used to multiply input signals A and B to obtain a corresponding product N. At step 904, the truncated/partial multipliers 614 and 618 may be used to compute P' based on N and the input modulus value M.

At step 906, subtraction circuit 624 may be used to subtract P' from product N to obtain difference T'. At step 908, a portion of the MSBs of T' may be used to identify an estimated quotient value Y from a predetermined lookup table. This lookup table may be computed ahead of time and stored on the integrated circuit device for fast retrieval. Based on the value of Y retrieved from the lookup table, error correction circuit 650 may perform a single step error correction by subtracting M*Y from T' (e.g., by performing redundant form subtraction using only shift and add operations without using any multiply circuits).

At step 912, final adjustment stage 662 may optionally be used to remove any residual error (e.g., to remove any remaining estimation error if R' is still greater than or equal to M. The upper bound for the number of subtractions needed at the final adjustment stage is known since the lookup table can show the maximum possible estimation error.

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The circuit techniques and methods of operations described above for improving a modular multiplication circuit that uses the Barrett reduction scheme is merely illustrative and is not intended to limit the present embodiments. If desired, these techniques and methods may also be applied to the Montgomery reduction algorithm, the classical modular reduction algorithm, Lehmer's GCD (greatest common denominator) algorithm, and other suitable arithmetic modular reduction processes.

EXAMPLES

The following examples pertain to further embodiments.

Example 1 is an integrated circuit, comprising: a first input port configured to receive a first input signal; a second input port configured to receive a second input signal; a third input port configured to receive a modulus value; an input multiplier configured to multiply the first input signal by the second input signal to generate a corresponding first product; a plurality of reduction multipliers configured to generate a second product using the first product and the modulus value; a subtraction circuit configured to compute a difference between the first and second products; and an error correction circuit configured to remove an estimated integer multiple of the modulus value from the difference in a single step.

Example 2 is the integrated circuit of example 1, wherein the plurality of reduction multipliers optionally comprise a first truncated multiplier that only partially computes a number of most significant bits (MSBs).

Example 3 is the integrated circuit of example 2, wherein the plurality of reduction multipliers optionally further comprise a second truncated multiplier that only partially computes a number of least significant bits (LSBs).

Example 4 is the integrated circuit of any one of examples 2-3, wherein the first truncated multiplier optionally has a first input terminal configured to receive only upper bits of the first product.

Example 5 is the integrated circuit of example 4, wherein the second truncated multiplier optionally has a second input terminal configured to receive an inverted version of the modulus value.

Example 6 is the integrated circuit of any one of examples 1-5, wherein the error correction circuit is optionally configured to use the difference to obtain an estimated quotient value from a lookup table.

Example 7 is the integrated circuit of example 6, wherein the error correction circuit is optionally further configured to use only upper bits of the difference to obtain the estimated quotient value from the lookup table.

Example 8 is the integrated circuit of any one of examples 6-7, wherein the lookup table is optionally a function of only a single modulus value.

Example 9 is the integrated circuit of any one of examples 6-7, wherein the lookup table is optionally a function of multiple different modulus values.

Example 10 is the integrated circuit of any one of examples 6-9, wherein the estimated integer multiple of the modulus value is optionally equal to the modulus value times the estimated quotient value obtained from the lookup table.

Example 11 is the integrated circuit of example 10, wherein the error correction circuit is optionally configured to compute the estimated integer multiple of the modulus value without a multiplier circuit.

Example 12 is the integrated circuit of example 11, wherein error correction circuit is optionally further configured to compute the estimated integer multiple using redundant form addition.

Example 13 is the integrated circuit of any one of examples 10-12, wherein error correction circuit optionally further comprises additional circuits for selectively shifting the modulus value based on the estimated quotient value.

Example 14 is the integrated circuit of example 13, wherein error correction circuit optionally further comprises a compressor circuit configured to receive the difference from the subtraction circuit and to receive signals from the additional circuits.

Example 15 is the integrated circuit of example 14, wherein the error correction circuit optionally further comprises an adder configured to receive signals from the compressor circuit and a carry input signal and to generate a corresponding trial remainder value.

Example 16 is the integrated circuit of example 15, optionally further comprising a final adjustment stage for selectively subtracting one or more modulus values from the trial remainder value.

Example 17 is a method of operating an integrated circuit, the method comprising: with a first multiplier, receiving first and second input signals and computing a first product by multiplying the first input signal by the second input signal; with a second multiplier, receiving a modulus value and computing a second product based on the received modulus value and the first product; with a subtraction circuit, computing a difference between the first and second products; and with an error correction circuit, subtracting an estimated integer multiple of the modulus value from the difference in a single step.

Example 18 is the method of example 17, optionally further comprising: using only a subset of bits in the difference to look up an estimated multiple value from a predetermined lookup table in the error correction circuit; and calculating the estimated integer multiple using the estimated multiple value.

Example 19 is the method of any one of examples 17-18, optionally further comprising: stalling the error correction circuit to remove a residual error after subtracting the estimated integer multiple of the modulus value from the difference.

Example 20 is a modular multiplication circuit, comprising: an input multiplier configured to compute a first product by multiplying a first input signal by a second input signal; a truncated multiplier configured to compute a second product based on an input modulus value and the first product; a subtraction circuit configured to compute a difference between the first and second products; and an error correction circuit configured to receive the difference from the subtraction circuit, to compute an estimated error multiple using the received difference, and to generate a corresponding trial remainder output value by subtracting the estimated error multiple from the difference.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
   a first input port configured to receive a first input signal;
   a second input port configured to receive a second input signal;
   a third input port configured to receive a modulus value;
   a first multiplier configured to multiply the first input signal by the second input signal to generate a corresponding first product;
   a plurality of second multipliers configured to generate a second product based at least in part on the first product and an inverted version of the modulus value;
   a subtraction circuit configured to compute a difference between the first and second products; and an error correction circuit configured to remove an estimated integer multiple of the modulus value from the difference in a single step.

2. The integrated circuit of claim 1, wherein the plurality of second multipliers comprise a first truncated multiplier that only partially computes a number of most significant bits (MSBs).

3. The integrated circuit of claim 2, wherein the plurality of second multipliers comprises a second truncated multiplier that only partially computes a number of least significant bits (LSBs).

4. The integrated circuit of claim 2, wherein the first truncated multiplier has a first input terminal configured to receive only upper bits of the first product.

5. The integrated circuit of claim 4, wherein the first truncated multiplier has a second input terminal configured to receive the inverted version of the modulus value.

6. An integrated circuit, comprising:
- a first input port configured to receive a first input signal;
- a second input port configured to receive a second input signal;
- a third input port configured to receive a modulus value;
- a first multiplier configured to multiply the first input signal by the second input signal to generate a corresponding first product;
- a plurality of second multipliers configured to generate a second product based at least in part on the first product and the modulus value;
- a subtraction circuit configured to compute a difference between the first and second products; and
- an error correction circuit configured to remove an estimated integer multiple of the modulus value from the difference in a single step, wherein the error correction circuit is configured to use the difference to obtain an estimated quotient value from a lookup table.

7. The integrated circuit of claim 6, wherein the error correction circuit is further configured to use only upper bits of the difference to obtain the estimated quotient value from the lookup table.

8. The integrated circuit of claim 6, wherein the lookup table is a function of only a single modulus value.

9. The integrated circuit of claim 6, wherein the lookup table is a function of multiple different modulus values.

10. The integrated circuit of claim 6, wherein the estimated integer multiple of the modulus value is equal to the modulus value times the estimated quotient value obtained from the lookup table.

11. The integrated circuit of claim 10, wherein the error correction circuit is configured to compute the estimated integer multiple of the modulus value without a multiplier circuit.

12. The integrated circuit of claim 11, wherein the error correction circuit is further configured to compute the estimated integer multiple of the modulus value using redundant form addition.

13. The integrated circuit of claim 10, wherein the error correction circuit comprises additional circuits for selectively shifting the modulus value based on the estimated quotient value.

14. The integrated circuit of claim 13, wherein the error correction circuit comprises a compressor circuit configured to receive the difference from the subtraction circuit and to receive signals from the additional circuits.

15. The integrated circuit of claim 14, wherein the error correction circuit comprises an adder configured to receive signals from the compressor circuit and a carry input signal and to generate a corresponding trial remainder value.

16. The integrated circuit of claim 15, comprising a final adjustment stage for selectively subtracting one or more modulus values from the trial remainder value.

17. A method of operating an integrated circuit, the method comprising:
- with a first multiplier, receiving first and second input signals and computing a first product by multiplying the first input signal by the second input signal;
- with a second multiplier, receiving an inverted version of a modulus value and computing a second product based at least in part on the received inverted version of the modulus value and the first product;
- with a subtraction circuit, computing a difference between the first and second products; and
- with an error correction circuit, subtracting an estimated integer multiple of the modulus value from the difference in a single step.

18. The method of claim 17, comprising:
- using only a subset of bits in the difference to look up an estimated multiple value from a predetermined lookup table in the error correction circuit; and
- calculating the estimated integer multiple of the modulus value using the estimated multiple value.

19. The method of claim 17, comprising:
stalling the error correction circuit to remove a residual error after subtracting the estimated integer multiple of the modulus value from the difference.

20. A modular multiplication circuit, comprising:
- an input multiplier configured to compute a first product by multiplying a first input signal by a second input signal;
- at least one truncated multiplier configured to compute a second product based at least in part on an input inverted modulus value and the first product;
- a subtraction circuit configured to compute a difference between the first and second products; and
- an error correction circuit configured to:
  - receive the difference from the subtraction circuit;
  - compute an estimated error multiple using the received difference; and
  - generate a corresponding trial remainder output value by subtracting the estimated error multiple from the difference.

* * * * *